United States Patent [19]

Gehrmann

[11] Patent Number: 5,644,365
[45] Date of Patent: Jul. 1, 1997

[54] METHOD AND CIRCUIT FOR GENERATING A COMPOSITE VIDEO SIGNAL

[75] Inventor: Rainer Gehrmann, Alsbach-Hähnlein, Germany

[73] Assignee: U.S. Philips Corporation, New York, N.Y.

[21] Appl. No.: 527,739

[22] Filed: Sep. 13, 1995

[30] Foreign Application Priority Data

Sep. 15, 1994 [DE] Germany ............... 44 32 788.9

[51] Int. Cl.$^6$ .......................................... H04N 9/74
[52] U.S. Cl. .................. 348/591; 348/590; 348/595
[58] Field of Search ........................ 348/586, 590, 348/591, 592, 593, 594, 595, 597, 599, 587; H04N 9/74, 9/75

[56] References Cited

U.S. PATENT DOCUMENTS

| | | | |
|---|---|---|---|
| 4,920,415 | 4/1990 | Chaplin | 348/590 |
| 4,947,255 | 8/1990 | Jackson et al. | 348/590 |
| 5,303,041 | 4/1994 | Nishimura | 348/590 |
| 5,386,242 | 1/1995 | Chaplin | 348/591 |
| 5,416,529 | 5/1995 | Lake | 348/586 |

FOREIGN PATENT DOCUMENTS

0360518  3/1995  European Pat. Off. ....... H04N 5/275

OTHER PUBLICATIONS

"Digital Keyers in Video Switches and Effects Systems", by Richard S. Bannister, SMPTE Journal, Mar. 1991, pp. 178–181.

*Primary Examiner*—Michael Lee
*Attorney, Agent, or Firm*—Edward W. Goodman

[57] ABSTRACT

A method and a circuit for generating a composite video signal formed from a foreground signal and a background signal in accordance with the luminance self-key mode is described, in which the key signal is derived from the luminance foreground signal in dependence upon a clipping level. To avoid a quadratic dependence of the luminance signal during product formation of the key signal with the foreground signal (referred to as "double multiplication"), the linear key signal should be replaced by a control signal which is hyperbolically formed in such a way that the unwanted quadratic dependence is eliminated.

8 Claims, 3 Drawing Sheets

METHOD AND CIRCUIT FOR GENERATING A COMPOSITE VIDEO SIGNAL

BACKGROUND OF THE INVENTION

1. Field of the Invention

The invention relates to a method of generating a composite video signal formed from a foreground signal and a background signal in accordance with the luminance self-key mode, in which the key signal is derived from the luminance foreground signal in dependence upon a clipping level. The invention also relates to a circuit for performing the method.

2. Description of the Related Art

The television technique employs several methods of mixing a plurality of pictures or their corresponding video signals. A frequently used method is fading, or switching two picture signal sources, one of which supplies the foreground signal and the other supplies the background signal. By means of a control or key signal (usually derived from the foreground signal), these signals can be automatically switched within a picture period in dependence upon an adjustable color or an adjustable level occurring in the video signal, such that the background signal instead of the foreground signal is passed on or displayed within a picture when these adjustable values are reached, the fading in the case of the adjustable color also being denoted as chroma key and in the case of the adjustable level being denoted as luminance key. If the key signal is derived from the foreground signal in the luminance key mode, and this in dependence upon a clipping level and an adjustable gain, then it is referred to as the luminance self-key mode.

In the luminance key mode, the fading of the foreground signal FG and the background signal BG is effected in dependence upon an adjustable clipping level Clip by the luminance signal Y from a third picture source. In accordance with FIG. 1a, a key signal k, in accordance with FIG. 1b is derived from the luminance signal Y by means of the clipping level Clip, which fixes a 50% fading, said key signal serving for the fading of the foreground signal FG on the background signal BG, in accordance with FIG. 1c, so as to generate a composite output signal Vo. The foreground picture FG then appears in the displayed picture at those locations where the luminance signal Y clearly exceeds the clipping level Clip, and the background picture BG appears at those locations where the luminance signal clearly falls below the clipping level Clip.

The linear fading range, which is situated symmetrically around the clipping level Clip, may alternatively be fixed by means of a parameter Gain. Moreover, the fading range can also be determined by the minimum and maximum limits Yu and Yo. The fading is generally defined in accordance with the formula:

$$Vo = k*FG + (1-k)*BG \qquad (1)$$

in which Vo is the output signal composed of the foreground signal FG and the background signal BG produced during the fading process, and in which k is the key signal which is derived from the luminance information Y of the third source by processing with a clip and gain circuit. In this case, k has the value 1 when the signal Y is larger than Yo and, the value zero when the signal Y is smaller than Yu. In between, the key signal k assumes values of between 0 and 1. During this fading phase, only one fraction of the foreground signal FG is thus passed on, but is supplemented by a complementary fraction (1−k) of the background signal BG.

As described above, there are basically two modes of defining the variation of the key signal k. On the one hand, this may be effected with the aid of the clipping level Clip and/or the parameter Gain in which, however, in this case, the two limit parameters Yu and Yo, as from which the definitive foreground signal and background signal situations are reached, are influenced simultaneously. On the other hand, this may be effected by means of the two values Yu and Yo defining the proportional range. Then the lower clipping level Yu can be fixed independently of the upper level Yo, and vice versa. For the key signal k, the set-up $$(Yo-Yu)/1 = (Y-Yu)/k \qquad (2)$$

which puts given Y differences in a ratio with the associated k values, the following relation can be given:

$$k = (Y-Yu)/(Yo-Yu) \text{ at } 0<k<1 \qquad (3)$$

A fading in accordance with equation (1) may be considered to be linear between the limit values, because there is a linear relation between the key signal k and the output signal Vo. This only applies when the foreground and the background signal sources are controlled by a third, separate signal source.

As already explained above, the key signal k is derived from the foreground signal FG in the luminance self-key mode, i.e., the controlling picture signal source is identical to the controlled picture signal source FG. As it were, the FG source fades itself in. The equation (1) for fading of the two sources is identical, but there is now a dual dependence on the same luminance signal. The key signal k has now originated from exactly the same foreground signal FG by linear processing, by which signal it should subsequently be multiplied. This "double multiplication" of the foreground signal FG yields a quadratic relation between the foreground signal FG and the product k*FG.

As a result of such a quadratic relation, the foreground luminance is underrated during the fading process. In accordance with FIG. 1d, a differently strong signal defect (black) is produced in the transition range between FG and BG, which defect leads to a black line along the key signal edge. This fading process takes place at each object edge of the picture contents of the foreground signal FG, at which edge a key signal change is generated.

EP 0 360 518 B1, corresponding to U.S. Pat. No. 4,947, 255, discloses a device and a method in which this "double multiplication" can be avoided in the luminance self-key mode, in that instead of the foreground multiplication, the lower clipping level having the value of the complementary key signal is subtracted from the foreground signal by means of the key signal k. However, since the subtraction can only be usefully effected for the luminance signal in this case, the associated chrominance value is arbitrary. Thus, there is no definitive clipping level available for the chrominance value subtraction so that the currently known fading by multiplication by means of the key signal must be performed for the chrominance signal (cf. also the journal "JSMPTE", March, 1991, pp. 178 to 181, particularly page 181, paragraph 2).

For the sake of clarity, it will be assumed that the foreground signal represents light letters on a dark background. Due to the key process, the dark background should be separated from the letters and replaced by the background signal. The abovementioned process of fading from the foreground signal to the background signal, or conversely, takes place at all letter edges. This means that dark rims appear at all letter edges which become particularly disturbing when the new background for the light letters is also relatively light.

SUMMARY OF THE INVENTION

It is therefore an object of the present invention to provide a method and a circuit of the type described in the opening paragraph with which these disturbing edges can be suppressed.

The above object is achieved in a method and a circuit of the type described in the opening paragraph, characterized in that the video output signal (Vo) is generated by fading in accordance with the equation Vo=h*FG+(1−)*BG, in which h is a hyperbolically formed control key signal pre-corrected in accordance with the equation h=1−(1−k*Yu/$Y_{FG}$, FG is the foreground signal and $Y_{FG}$ is the foreground luminance signal, BIG is the background signal and k is the linear key signal, and in which Yu corresponds to the lower clipping level of the foreground luminance signal, and in that the fading is performed for the luminance component as well as for the chrominance components.

The method according to the invention, has the advantage that these disturbing black edges are eliminated both for the luminance signal and for the chrominance signal.

These and other aspects of the invention will be apparent from and elucidated with reference to the embodiments described hereinafter.

DESCRIPTION OF THE PREFERRED EMBODIMENTS

After the currently known methods have been described in the opening paragraph with reference to FIG. 1, the method according to the invention will now be described with reference to FIG. 2.

It is an object of the method according to the invention to avoid said quadratic dependence of the luminance signal when forming the product. Since the double multiplication only occurs in the key signal k but not in its complement in equation (1), the signal k should be replaced by a new control signal h having such a hyperbolic variation that the unwanted quadratic dependence is eliminated thereby:

$$Vo=h*FG+(1-k)*BG \quad (4)$$

In this equation, h*FG is the part of the output signal Vo which is usually referred to as "fill signal", because it fills the keyed apertures in the background of the picture. Accordingly, $$h*Y_{FG}=Y_{Fill} \quad (5)$$

may be referred to as the fill luminance signal.

Figure 1A:
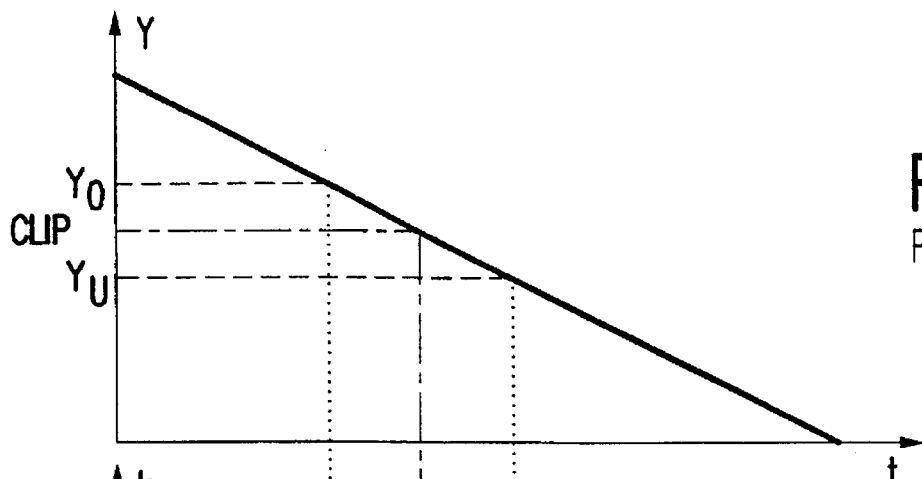
FIGS. 1a–1d show graphically the signals to be processed in accordance with currently known methods.
Figure 1B:
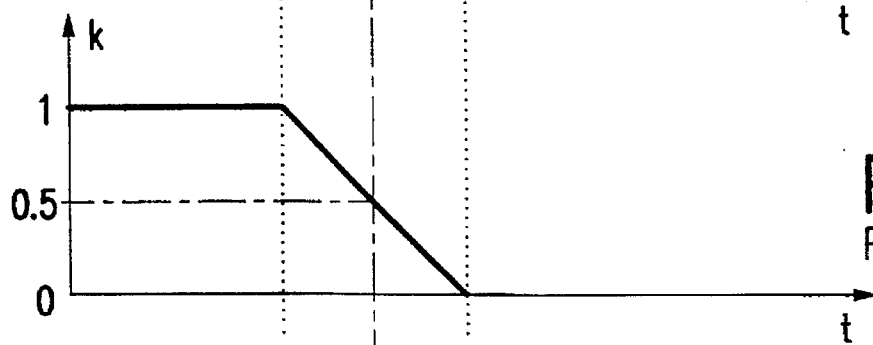
Figure 1C:
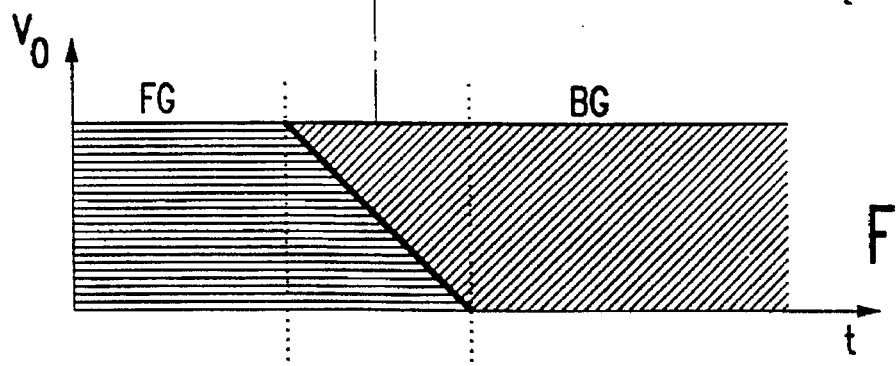
Figure 1D:
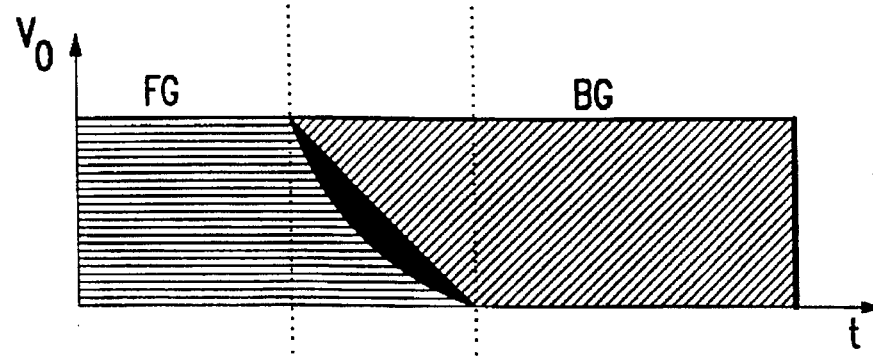
Figure 2A:
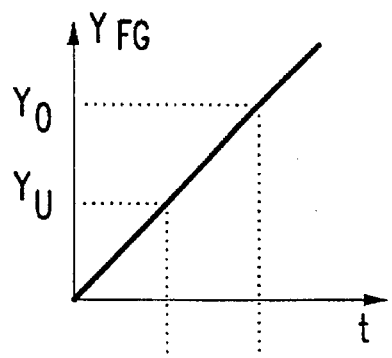
FIGS. 2a–2e show graphically the signals to be processed in accordance with the invention.

FIG. 2a shows the variation with respect to time of a foreground luminance signal $Y_{FG}$ which is supposed to be linear with respect to time in this case so as to elucidate the relations. The variation of the associated chrominance component of the foreground signal FG is initially relevant. The aim of a linear key signal processing is a $Y_{Fill}$ signal in accordance with FIG. 2b. It has been assumed that the $Y_{FG}$ signal is suppressed as far as a lower luminance level Yu and that this $Y_{FG}$ signal is transmitted in an unchanged form as from an upper luminance level Yo, and that in the important range in between there is a linear relation between the $Y_{FG}$ signal and the resultant fill signal $Y_{Fill}$.

Figure 2B:
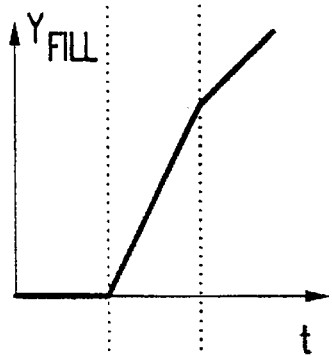
Figure 2C:
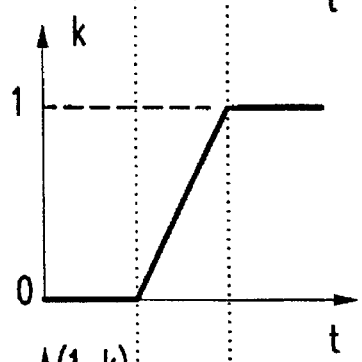

FIG. 2c shows the key signal k which is produced, for example, in the usual key signal processing by means of the clipping level (Clip) and gain (Gain). At a later stage, this signal is to be replaced by the precorrelated signal h. However, initially it is further needed for forming the complementary signal (1−k) in accordance with FIG. 2d, with which the background fading should be performed. The complementary signal (1−k) according to FIG. 2d has its "1 state" at the location where $Y_{FG}$ has not yet exceeded the lower luminance level Yu (100% background fading), and its "0 state" at the location where $Y_{FG}$ has exceeded the upper luminance level Yo (no background fading).

As already stated, to avoid this "double multiplication", the fill luminance signal $Y_{Fill}$ should actually not be generated in the proportional range by way of multiplication (fading) of the foreground luminance signal $Y_{FG}$ with a key signal k, but, as also stated in EP 0 360 518, by subtraction of the valued lower luminance signal level Yu, in which Yu is the luminance signal component which should be completely removed from the foreground signal FG. The evaluation factor should then be the complementary key signal (1−k), because this leads to a complete removal of the luminance signal in the background range, whereas the foreground range ($Y_{FG}$ above Yo) remains unaffected. In between is the proportional range at which the subtraction decreases linearly with an increasing luminance signal level.

Figure 2D:
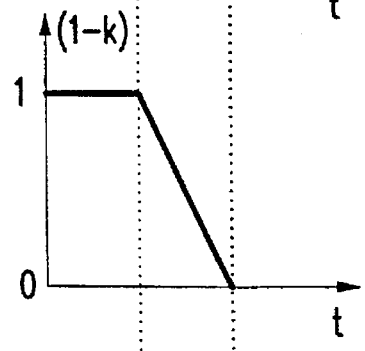

By means of the complementary key signal (1−k), the above required subtractive relation for the fill luminance signal $Y_{Fill}$ can be indicated as follows:

$$Y_{Fill}=Y_{FG}-(1-k)*Yu \quad (6)$$

see particularly FIGS. 2a, 2d and 2b. The subtraction of (1−k)*Yu from the signal $Y_{FG}$ leads to negative values as far as the point $Y_{FG}$=Yu, which values are limited to zero. From this point onwards, the subtrahend decreases linearly, i.e., the signal $Y_{Fill}$ linearly approaches the signal $Y_{FG}$. As from $Y_{FG}$=Yo, the subtrahend is zero so that the signal is $Y_{Fill}$=$Y_{FG}$. The subtraction actually yields the desired variation, as was required as the aim in FIG. 2b. However, as stated, this process is only applicable to the luminance signal.

Now, however, in addition to the fading formula in accordance with equation (5), there is a second set-up for determining the signal $Y_{Fill}$ by means of the subtraction formula in accordance with equation (6). By equating these two formulas h*$Y_{FG}$=$Y_{FG}$−(1−k)*Yu, the result is:

$$h=1-(1-k)*Yu/Y_{FG} \text{ at } 0<h<1 \quad (7).$$

According to the invention, this process of equating the fill luminance signals and application of the resultant key signal h is not only proposed for the fill luminance signal but also for the fill chrominance components Cr and Cb. This means that in the luminance self-key mode, a fading in accordance with equation (4) is performed by means of a key signal h in accordance with equation (7) for fading all three foreground components Y, Cr and Cb, while the key signal k in partial ranges is directly proportional to the foreground luminance signal $Y_{FG}$ and Yu represents the lower clipping level of the foreground luminance signal $Y_{FG}$.

In equation (7) representing the most general form of the solution, it is, however, disadvantageous that there is still the dependence of two different signal variables, viz. $Y_{FG}$ and (1-k). However, the aim should be to limit the dependence to one variable only. Dependent on whether the foreground luminance signal $Y_{FG}$ or the key signal k is to be made the sole control value, two different forms of equation (7) are the result.

If the key signal k is to be the only control value, $Y_{FG}$ (=Y) should be replaced with the aid of equation (3). This yields:

$$h = k * \frac{Yo}{k*(Yo-Yu)+Yu} \text{ at } 0 < h < 1. \quad (8)$$

However, if the foreground luminance signal $Y_{FG}$ is to be the only control value, k should be replaced with the aid of equation (3). This yields:

$$h = \frac{Yo}{(Yo-Yu)} * \left(1 - \frac{Yu}{Y_{GF}}\right) \text{ at } 0 < h < 1. \quad (9)$$

Figure 2E:
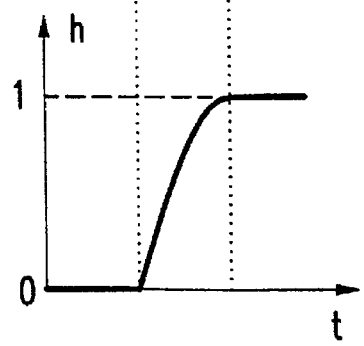

The new key signal h is thus controlled by one value only in both cases, because Yo and Yu are only static parameters. The variation with respect to time of the key signal h for the example chosen is shown in FIG. 2e. It is exactly the variation which is required to establish the required linear $Y_{Fill}$ relation by way of multiplication by the foreground signal $Y_{FG}$.

Figure 3:
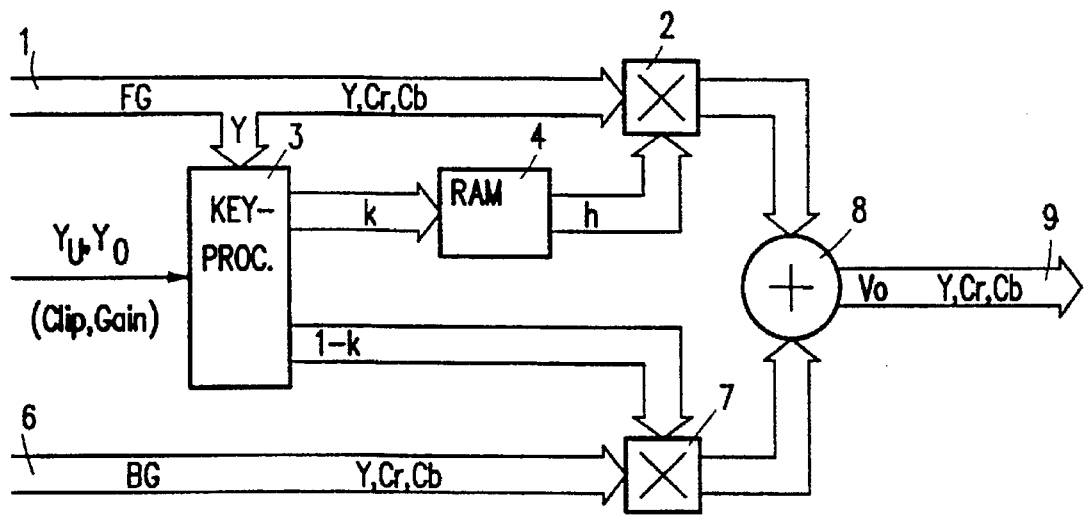
FIG. 3 is a block diagram of a first embodiment.

FIG. 3 shows a first embodiment for performing the method according to the invention in accordance with equation (8). The foreground signal FG, comprising, for example, digital components Y, Cr, Cb, is applied from an input 1 to the first input of a multiplier 2, while the luminance signal $Y_{FG}$ taken off this input is applied to a key signal generating circuit 3. A post-amplified, limited key signal k as well as its complement (1-k) is generated from the signal $Y_{FG}$ in known manner and as described above by controlling with Yu and Yo or with the adjustable clipping level Clip and the preselectable gain Gain. A table in a random-access memory (RAM 4) is now addressed with the key signal k, in which Table, the relation between the precorrected key signal h and the linear key signal k in accordance with equation (8) is precomputed for all possible k values and stored. The h values may be precomputed, for example, in a digital signal processor (not shown) which is also capable of performing a quick update when, for example, the parameters Yu and/or Yo, or Clip and/or Gain change. During the fading process, these h values are recalled and applied to the second input of the multiplier 2, while the fill signal can then be taken off its output.

The background signal BG, which also comprises digital components Y, Cr, Cb, is applied via an input 6 to the first input of a second multiplier 7 whose second input conveys the complementary key signal (1-k). The correspondingly keyed background signal BG can then be taken off the output of the multiplier 7. The output signals of the multipliers 2 and 7 are further applied to a respective input of an adder 8 so that the resultant video output signal Vo composed of the foreground signal and the background signal can be taken off its output 9.

Figure 4:
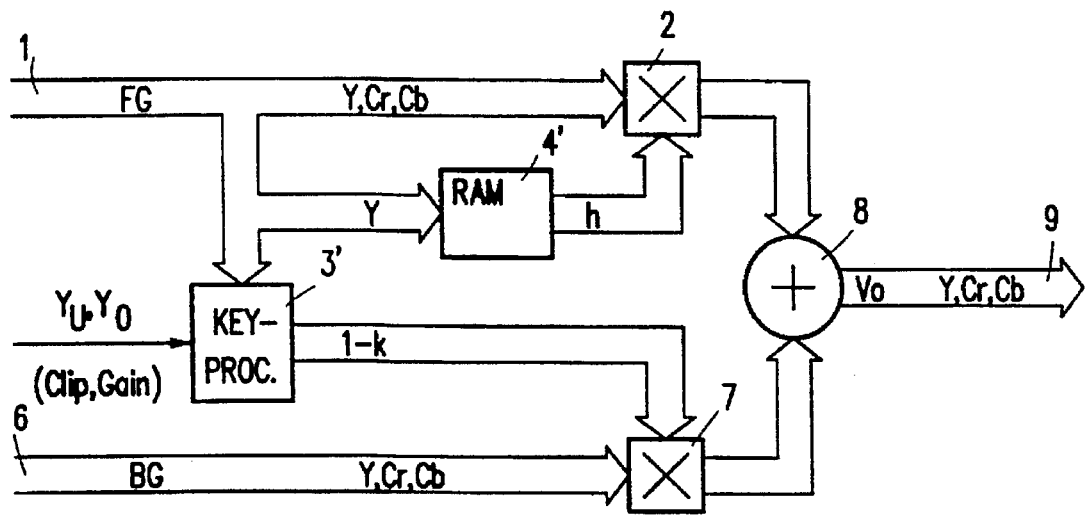
FIG. 4 is a block diagram of a second embodiment for performing the method according to the invention.

The block diagram of FIG. 4 differs from that of FIG. 3 by the evaluation of the random-access memory 4'. Instead of the key signal k, the foreground luminance signal $Y_{FG}$ for addressing the Table in memory 4' is used, in which the relation between h and $Y_{FG}$ in accordance with equation (9) has been computed and stored.

I claim:

1. A method of generating a composite video signal, formed from a foreground signal and a background signal, in accordance with a luminance self-key mode, in which a key signal is derived from a luminance foreground signal in dependence upon a clipping level, characterized in that the method comprises the steps:

generating an video output signal (Vo) by fading in accordance with Vo=h*FG+(1-k)*BG, in which h is a hyperbolically formed control key signal pre-corrected in accordance with h=1-(1-k)*Yu/$Y_{FG}$, FG is the foreground signal and $Y_{FG}$ is the luminance foreground signal, BG is the background signal and k is a linear key signal, and in which Yu corresponds to a lower clipping level of the luminance foreground signal; and performing the fading for the foreground luminance signal as well as for foreground chrominance signals.

2. A method as claimed in claim 1, characterized in that the fading is controlled by means of the linear key signal k in accordance with $$h = k* \frac{Yo}{k*(Yo-Yu)+Yu} \text{ at } 0 < h < 1. \quad (8)$$

in which Yo is an upper clipping level and Yu is the lower clipping level.

3. A method as claimed in claim 1, characterized in that the fading is controlled by means of the foreground luminance signal ($Y_{FG}$), in accordance with $$h = \frac{Yo}{(Yo-Yu)} * \left(1 - \frac{Yu}{Y_{GF}}\right) \text{ at } 0 < h < 1. \quad (9)$$

in which Yo is an upper clipping level and Yu is the lower clipping level.

4. A method as claimed in claim 2, characterized in that the hyperbolically formed control key signal (h) is computed for all linear key signal values (k) and is stored in the form of a Table.

5. A method as claimed in claim 3, characterized in that the hyperbolically formed control key signal (h) is computed for all foreground luminance signal values ($Y_{FG}$) and is stored in the form of a Table.

6. A circuit for generating a composite video signal formed from a foreground signal and a background signal in accordance with a luminance self-key mode, in which a linear key signal (k) is derived from q+ luminance foreground signal in dependence upon a clipping level, characterized in that said circuit comprises:

a random-access memory (RAM) for supplying a hyperbolically formed control key signal (h);

a first multiplier having a first input for receiving luminance and chrominance components (Y, Cr, Cb) of the foreground signal ($Y_{FG}$), and second input coupled to the output of said random-access memory (RAM) for receiving the hyperbolically formed control key signal (h);

a second multiplier having a first input for receiving luminance and chrominance components (Y, Cr, Cb) of the background signal ($Y_{BG}$), and a second input for receiving a complement (1-k) of the linear key signal (k); and an adder having respective inputs coupled to outputs of the first and second multipliers, respectively, whereby the output video signal (Vo) of the composite video signal picture is provided at an output of said adder.

7. A circuit as claimed in claim 6, characterized in that the random-access memory is addressable by means of the linear key signal (k) derived from the foreground luminance signal ($Y_{FG}$).

8. A circuit as claimed in claim 6, characterized in that the random-access memory is addressable by means of the foreground luminance signal ($Y_{FG}$).

* * * * *